United States Patent [19]

Thurman

[11] Patent Number: 4,703,093

[45] Date of Patent: Oct. 27, 1987

[54] METHOD OF PREPARING A POLYMER FOR CROSS-LINK ROTATIONAL MOLDING AND A POLYMER PREPARED BY SAID METHOD

[75] Inventor: Glenn A. Thurman, Dyersburg, Tenn.

[73] Assignee: Colonial Rubber Works, Inc., Dyersburg, Tenn.

[21] Appl. No.: 692,098

[22] Filed: Jan. 16, 1985

[51] Int. Cl.$^4$ ................................................ C08F 8/00
[52] U.S. Cl. .................................... 525/387; 525/333.8
[58] Field of Search .......................................... 525/387

[56]  References Cited

U.S. PATENT DOCUMENTS 3,876,613  4/1975  Needham et al. ................... 525/387
4,271,279  6/1981  Pastorino et al. ................... 525/387
4,301,063  11/1981  Sown ................................... 525/387
4,465,812  8/1984  Moriguchi et al. .................. 525/387

FOREIGN PATENT DOCUMENTS 57-149342  3/1984  Japan .

Primary Examiner—Joseph L. Schofer
Assistant Examiner—Bernard Lipman
Attorney, Agent, or Firm—Killworth, Gottman, Hagan & Schaeff

[57]  ABSTRACT

The present invention relates to a method of preparing a polymer for rotational molding, and a polymer prepared by said method. The method of the invention comprises grinding a polymer to produce ground polymer particles of a size suitable for rotational molding, heating the ground polymer to a temperature below its melting point, contacting the ground polymer with a peroxide, which may be mixed with an initiator, at a temperature below the activation temperature of the peroxide, and drying and cooling the ground polymer to a free-flowing powder. The method of the invention produces a polymer particle having a size suitable for rotational molding and which has a peroxide curing agent and, if desired, an initiator absorbed therein.

10 Claims, 6 Drawing Figures

METHOD OF PREPARING A POLYMER FOR CROSS-LINK ROTATIONAL MOLDING AND A POLYMER PREPARED BY SAID METHOD

BACKGROUND OF THE INVENTION

1. Field of the invention

The present invention relates to a method of preparing a polymer for rotational molding and to a polymer particle prepared by said method.

2. Prior Art Statement

Rotational molding is used to prepare some hollow-molded articles such as storage tanks, gasoline tanks for automobiles, and some toys. Rotational molded hollow polymeric articles are prepared by placing a powdered polymeric material in a mold which is rotated on two axes (as in a martini shaker), and heating the polymeric material to its molding temperature. The polymeric material melts and coats the surface of the mold, producing a hollow article molded in the shape of the mold. Depending on the purpose for which the hollow article is to be used, the polymeric powder used to make the article can be either a thermoplastic or a thermo-set material. In those applications where a thermoset (cross-linked) polymer is used, the polymer is cured due to heating during the rotational molding operation.

In prior art methods, the polymeric powder used in cross-link rotational molding is prepared by adding raw polymer feedstock, together with a curing agent (usually a peroxide), into a melt extruder. The curing agent is incorporated into the polymer during melt extrusion thereof. The extruded material is made into pellets by conventional means. The pellets, which have the curing agent incorporated therein, are ground and screened to produce a powder having a size, about 30 to 35 mesh, suitable for rotational molding.

Since curing agents (e.g. peroxides) are very reactive, and their half-life is reduced when heated, the polymer powder produced by the prior art method (which is heated in the melt extruder and is heated a second time from frictional forces in the grinding step) contains a curing agent which has a reduced activity. Also, since some of the peroxide may be activated in the prior art method for preparing a powder for rotational molding, crosslinking of the polymer may occur prematurely.

It is known in the art to prepare, in a batch process, polymer granules, which are to be used in the preparation of insulating wire, by absorbing an organic peroxide curing agent onto the surface of said polyme granules, as is disclosed by Sumitomo Chemical Ltd. in Japanese Patent No. 57-149342.

By using the method of the present invention, intermediate melt processing steps, which are normally required to add curatives to a polymer which is being prepared for rotational molding, are not required. The possibility of premature activation of the curing agent and/or crosslinking during such intermediate steps can be substantially eliminated by use of the present invention. The present invention has the advantages that the curative, with or without an initiator, can be added to and absorbed by a polymer which is already in a form which can subsequently be used in rotational molding, i.e. in powder form, and the temperatures in the method steps of the invention can be easily controlled.

SUMMARY OF THE INVENTION

In accordance with the present invention there is provided a method of preparing a polymer for rotational molding. The method comprises grinding the polymer to produce ground polymer particles of a size suitable for rotational molding, and contacting the ground polymer with a curing agent at a temperature below the melting point of the polymer and below the activation temperature of the curing agent. The ground polymer is then subjected to drying and cooling to produce a free-flowing polymer powder.

The invention also provides a polymer particle having a size suitable for rotational molding which has a curing agent trapped or absorbed within the particles.

Other aspects, embodiments, objects and advantages of this invention will become apparent from the following specification, claims and drawings.

DESCRIPTION OF THE PREFERRED EMBODIMENTS

Figure 1:
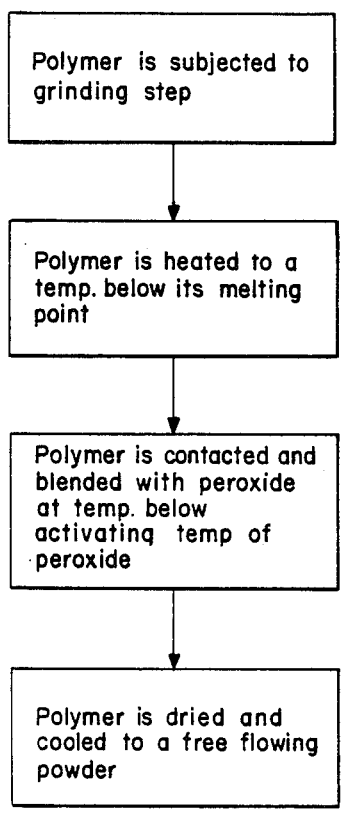
FIG. 1 is a block diagram illustrating the method steps of the present invention.

Reference is now made to FIG. 1 of the drawings which illustrates a block diagram of the method of the present invention. In the method of the invention, a polymer which is to be prepared for rotational molding is subjected to a conventional grinding step utilizing conventional grinding means known in the art. In the grinding step, the polymer is pulverized to a size which is suitable for use in rotational molding. In the preferred embodiment of the invention, the polymer will be ground to a size of about 30 to 35 mesh. Those skilled in the art will recognize that the grinding of a polymer, because of shear and frictional forces, will generate heat. In a totally continuous process, the ground polymer, immediately after grinding, may be contacted with a curing agent, such as an organic peroxide, in order to absorb the curing agent into the polymer. In the preferred embodiment of such a method, although considerable heat will be generated by the grinding step, for most polymers, an additional preheating step will be required to bring the polymer to the optimum temperature for absorption. In the illustrated embodiment of the invention, because of the economics involved, the grinding step is carried out separately from the remainder of the process. In the illustrated embodiment, after the grinding step, the ground polymer is heated to a temperature below its melting point. In one embodiment of the invention, for example, where the polymer is high density polyethylene (HDPE), the ground polymer particles will be heated to about 160°–195° F. While the polymer is maintained at the above temperature, it is contacted and blended with a peroxide curing agent (with or without an initiator, for example TATM, mixed therewith.) The above temperature is below the activating temperature of the peroxide. The temperature at which specific curing agents and initiators are activated are well known to those skilled in the art, and may be found in most reference materials dealing with the treatment of polymers. After the ground polymer particles are contacted and blended with the peroxide, the polymer is dried and cooled, the peroxide being absorbed within the particles. After drying and cooling, the polymer is in the form of a free flowing powder.

Although HDPE is described in the illustrated embodiment of the invention, it will be recognized by those skilled in the art that the method of the invention can be used with other suitable polymers. The method of the invention may be carried out on low density polyethylene (LDPE), linear LDPE, HDPE, polypropylene, and copolymers thereof. In most applications, an organic peroxide will be used as a curing agent in the method of the invention. The preferred peroxide in the illustrated embodiment is dicumyl peroxide.

Figure 2:
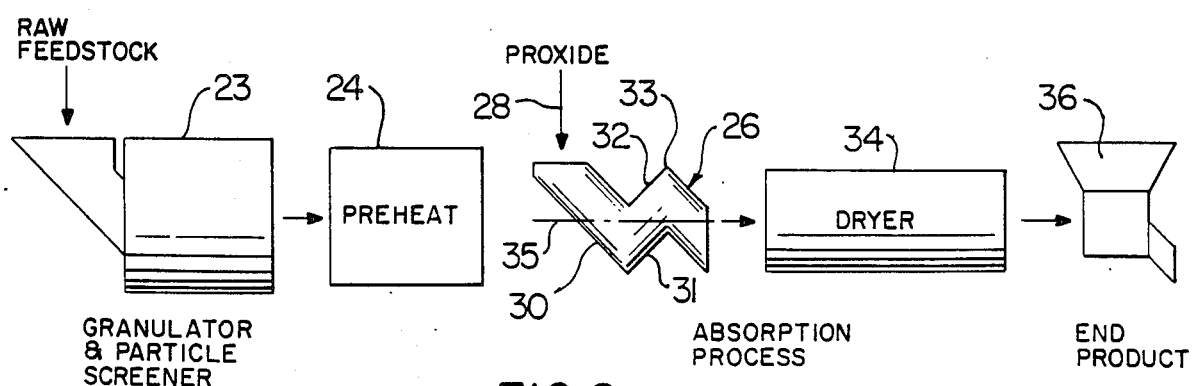
FIG. 2 is a simplified illustration of the apparatus used in the method of the present invention.

In the illustrated method of the invention of FIG. 2, HDPE which has been ground into a 30-35 mesh powder in grinder 22, is preheated to a temperature of about 160°-195° F. by heat source 24, and is fed into a rotational mixer 26 while a liquid mixture of an organic peroxide is simultaneously sprayed onto the HDPE powder through sprayer 28. These steps may be carried out continuously if desired.

Any suitable means of heating the polymer may be used. In the preferred embodiment, the polymer will be heated by a stream of hot air. Heating the polymer changes its specific absorption in the same manner that heating a solvent increases its dissolving capabilities.

The HDPE powder and peroxide are slowly mixed or blended in rotational mixer 26 which, in the preferred embodiment, is rotated at about 10 RPM (revolutions per minute). In the preferred embodiment of the invention, rotational mixer 26 will be a W-shaped continuous blender which permits a continuous feed of the polymeric powder.

The rotational mixer 26 illustrated in FIG. 2 comprises a feed chute 30 and mixing legs 31 and 32. In the illustrated embodiment, legs 31 and 32 rotate eccentrically generally about longitudinal axis 35. The movement of legs 31 and 32, which occurs during rotation, causes a mixing action of the peroxide and polymer powder; while the angled connecting point 33 of legs 31 and 32 causes separation of the mixing polymer and peroxide from that which is already mixed at the half turn, as feedstock, which is continuously added, pushes the powder in the mixer 24 forward. On the downward side of the rotation of leg 32, the polymer powder which has passed point 33, is dumped into tubular dryer 34. The polymer pwder is dried by means well known in the art and is then transferred to hopper 36 from which it is packaged for shipment.

As will be apparent to those skilled in the art, rotational mixer 26 may have more than 2 mixing legs, the number being determined by the amount and the speed of the mixing required for a particular purpose. Rotational mixer 26 and tubular dryer 34 are standard equipment available from Patterson-Kelley Co., East Stroudsburg, PA 18301.

Figure 3:
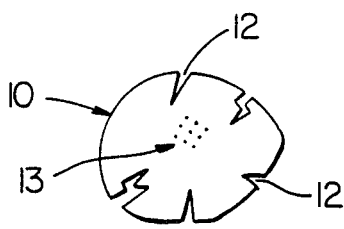
FIG. 3 is an illustration of a particle of polymer after grinding.
Figure 4:
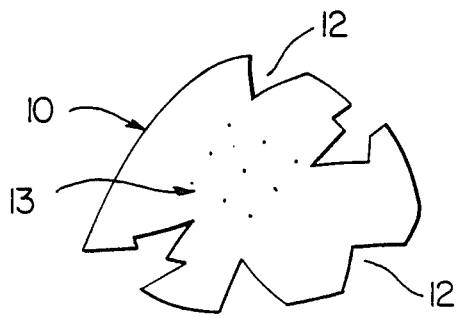
FIG. 4 is an illustration of a particle of polymer which has been heated to a temperature below its melting point.
Figure 5:
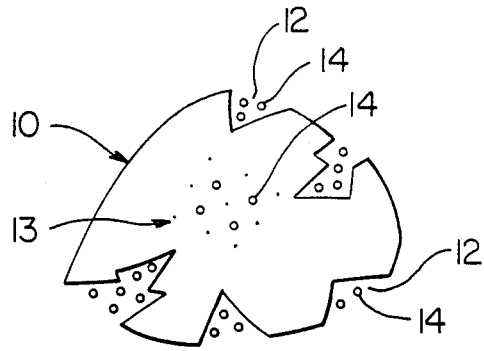
FIG. 5 is an illustration of a particle of polymer at an elevated temperature in which a curing agent has been incorporated into the lattice structure and the crevices thereof.

An exemplary embodiment of the process of the invention, and the particles produced thereby, are illustrated in FIGS. 3-5.

Figure 6:
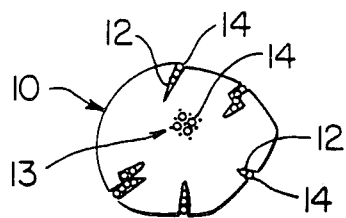
FIG. 6 is an illustration of a cooled particle of polymer in which a curing agent has been incorporated into the lattice structure and the crevices thereof.

Reference is now made to FIG. 3 which illustrates a ground polymer particle 10 of the invention which has microscopic cracks or crevices 12 and lattice structure 13 in its outside surface. In the heating step of the method, the polymer expands, which causes the cracks and crevices 12, and the lattice structure 13 in the surface of the gound polymer particles 10 to expand also, as is illustrated in FIG. 4. When a heated, ground polymer particle 10 is contacted and blended with a peroxide 14, the peroxide 14 is deposited into the crevices 12 and the lattice structure 13 of the polymer particle 10, as is illustrated in FIG. 5. When the polymer particle 10 is subjected to the cooling and drying step, the polymer particle 10 contracts, thereby reducing the size of the cracks and crevices 12 in the outside surface thereof. When the cracks and crevices 12 and lattice structure 13 contract, peroxide 14 is trapped in cracks and crevices 12 and in lattice structure 13, thereby incorporating peroxide 14 into the polymer particle 10 as is illustrated in FIG. 6.

Accordingly, when polymer particle 10 is used in rotational molding, the polymer particles of the invention may be used directly in conventional rotational molding apparatus. The operator needs only to raise the temperature of the polymer in the rotational molding apparatus to its melting point, and above the activation point of the initiator and curing agent, in the rotational molding process.

The method of the present invention avoids the problems, which can occur in the prior art process, of crosslinking of the polymer prior to rotational molding, and reduced activity of the peroxide curing agent.

While the present exemplary embodiment of this invention, and the method of practicing the same has been illustrated and described, it will be recognized that this invention may be otherwise variously embodied and practiced within the scope of the following claims.

What is claimed is:

1. In a method of preparing a polymer for rotational molding by grinding a polymer selected from the goup consisting of low density polyethylene, linear low density polyethylene, high density polyethylene, polypropylene, and copolymers thereof and mixing said polymer with an organic peroxide curing agent, the improvement comprising the steps of: grinding said polymer to produce polymer particles of a size suitable for rotational molding, heating said particles to a temperature below their melting point, contacting and blending said ground polymer particles with a curing agent at a temperature below the melting point of said polymer and below the activation temperature of said curing agent and drying and cooling said ground polymer particles to a free-flowing powder.

2. The method of claim 1 in which said curing agent is dicumyl peroxide.

3. The method of claim 1 in which said contacting step further comprises blending said ground polymer and curing agent in a rotational mixer.

4. The method of claim 3 which further comprises blending said polymer and said curing agent in a rotational blender at about 10 RPM.

5. The method of claim 1 in which the grinding step further comprises grinding said polymer to a size of about 30 to 35 mesh.

6. The method of claim 1 in which said contacting step further comprises contacting said polymer and said curing agent at a temperature above the ambient temperature.

7. The method of claim 1 further comprising the step of heating said polymer prior to said contacting step.

8. The method of claim 7 in which the heating step further comprises heating said polymer to a temperature of about 160°–195° F.

9. The method of claim 7 in which the heating step further comprises expanding and cracking the surface of said polymer particles thereby forming cracks in said surface and expanding the lattice structure of said polymer; said contacting step further comprises incorporating said curing agent into said cracks and lattice structure; and said drying and cooling step further comprises contracting the surface of said polymer particles, closing said cracks and lattice structure, and trapping said curing agent within said surface.

10. The method of claim 1 which further comprises providing said organic peroxide together with an initiator.

* * * * *